(12) United States Patent
Choi et al.

(10) Patent No.: US 8,192,240 B2
(45) Date of Patent: Jun. 5, 2012

(54) CONTRA-ROTATING PROPELLER SUPPORTED ON RUDDER HORN OF SHIP

(75) Inventors: Soon Ho Choi, Daejeon (KR); Hee Sang Cho, Daejeon (KR); Seong Sun Rhyu, Daejeon (KR); Se Myun Oh, Seoul (KR)

(73) Assignee: Samsung Heavy Ind. Co., Ltd. (KR)

( * ) Notice: Subject to any disclaimer, the term of this patent is extended or adjusted under 35 U.S.C. 154(b) by 170 days.

(21) Appl. No.: 12/602,356

(22) PCT Filed: May 30, 2008

(86) PCT No.: PCT/KR2008/003065
§ 371 (c)(1),
(2), (4) Date: Nov. 30, 2009

(87) PCT Pub. No.: WO2008/147146
PCT Pub. Date: Dec. 4, 2008

(65) Prior Publication Data
US 2010/0178817 A1 Jul. 15, 2010

(30) Foreign Application Priority Data
Jun. 1, 2007 (KR) .......... 10-2007-0053907

(51) Int. Cl.
*B63H 25/42* (2006.01)
(52) U.S. Cl. .......... 440/51; 440/81
(58) Field of Classification Search .......... 440/51, 440/80, 81; 416/128
See application file for complete search history.

(56) References Cited

U.S. PATENT DOCUMENTS

| 5,030,149 A | * | 7/1991 | Fujita .......... 440/75 |
| 5,087,230 A | * | 2/1992 | Yates et al. .......... 475/151 |
| 5,413,512 A | * | 5/1995 | Belenger .......... 440/74 |
| 6,966,804 B2 | | 11/2005 | Levander | |

FOREIGN PATENT DOCUMENTS

| JP | S60-095397 | 6/1985 |
| JP | 61-001598 | 1/1986 |
| JP | 61-144454 | 7/1986 |
| JP | S63-016298 | 2/1988 |
| JP | H05-193563 | 8/1993 |
| JP | 2004-306947 | 11/2004 |
| KR | 20-0324845 | 8/2003 |
| KR | 10-2004-0004863 | 1/2004 |

OTHER PUBLICATIONS

The Chinese Office Action dated Dec. 13, 2011 and the English translation thereof.
The Japanese Office Action dated Jan. 24, 2012 and the English summary thereof.

* cited by examiner

*Primary Examiner* — Stephen Avila
(74) *Attorney, Agent, or Firm* — Harness, Dickey & Pierce, P.L.C.

(57) ABSTRACT

A contra-rotating propeller system is installed between a rudder horn of a ship and shaft support at an engine-output side. The system includes a propeller shaft rotatably supported by the rudder horn and the shaft support, respectively, a front propeller fixed to the propeller shaft, a counter rotating gear set installed on the rudder horn and connected with the propeller shaft, and a rear propeller connected to the counter rotating gear set and disposed between the rudder horn and the front propeller.

7 Claims, 3 Drawing Sheets

[Fig. 1]
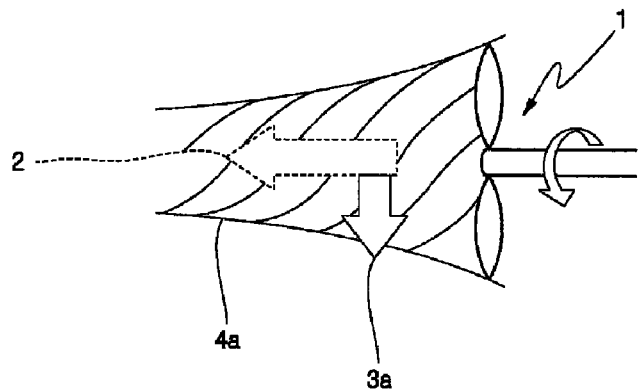
[Fig. 2]
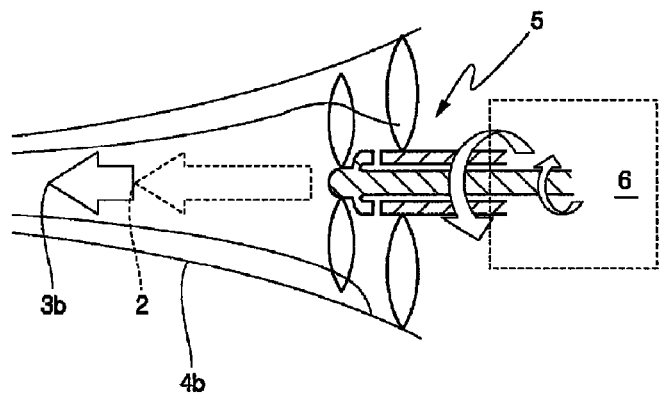
[Fig. 3]
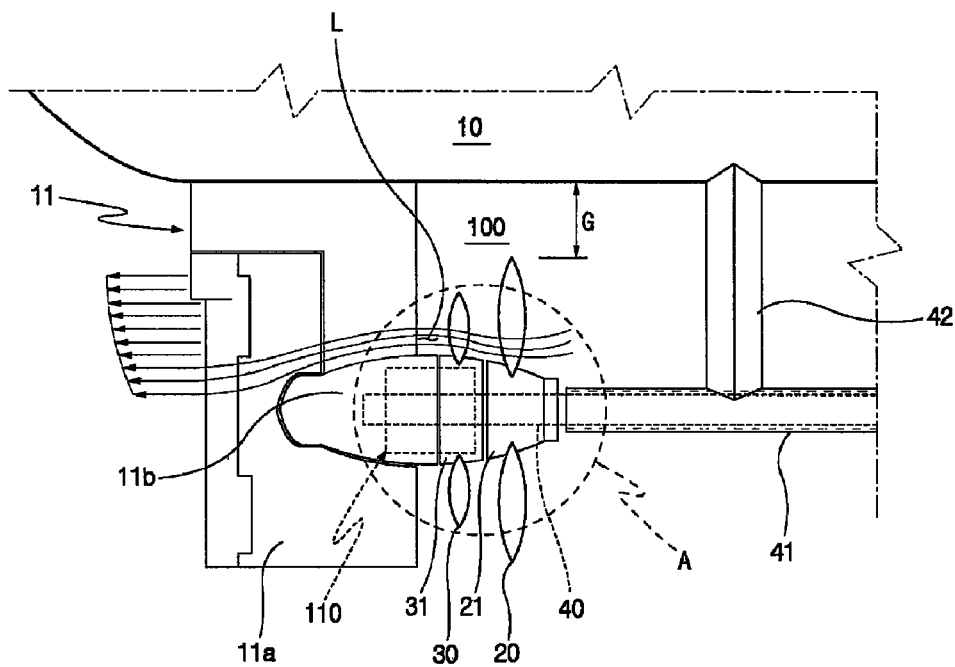

[Fig. 4]
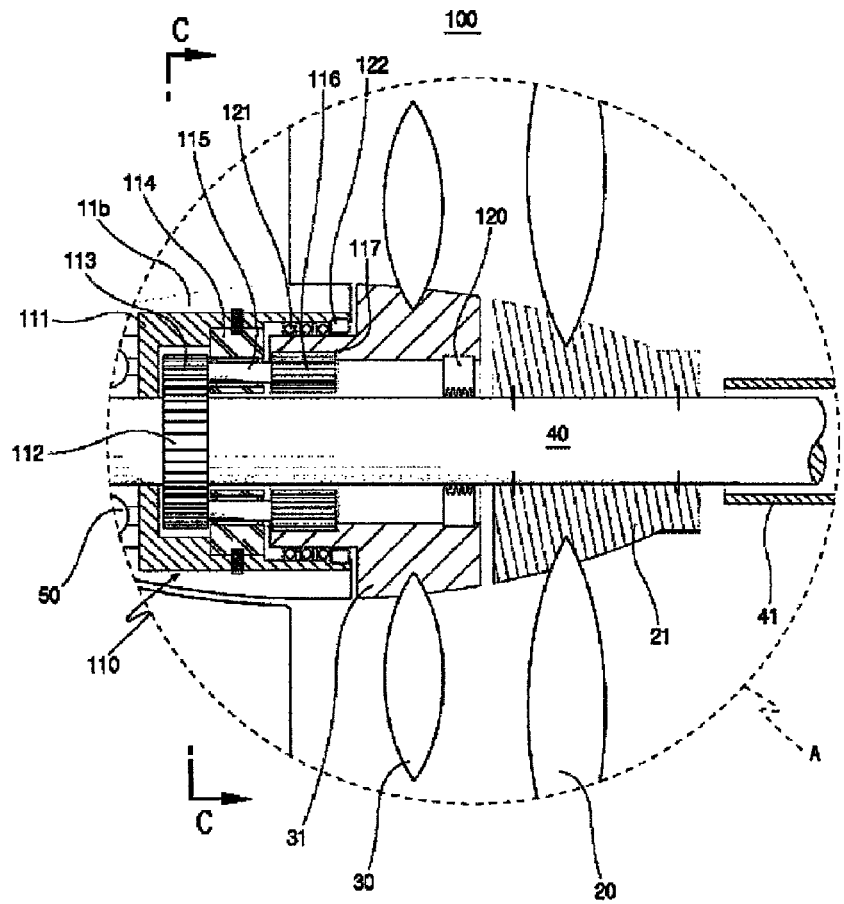
[Fig. 5]
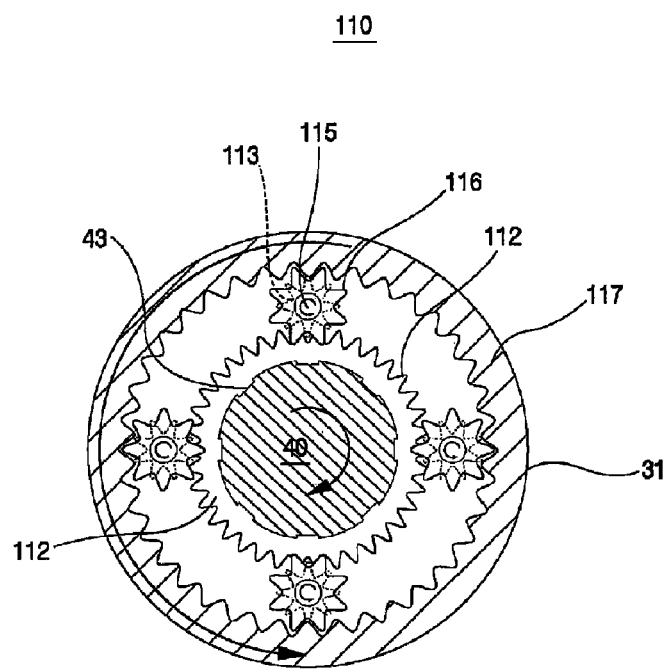

[Fig. 6]
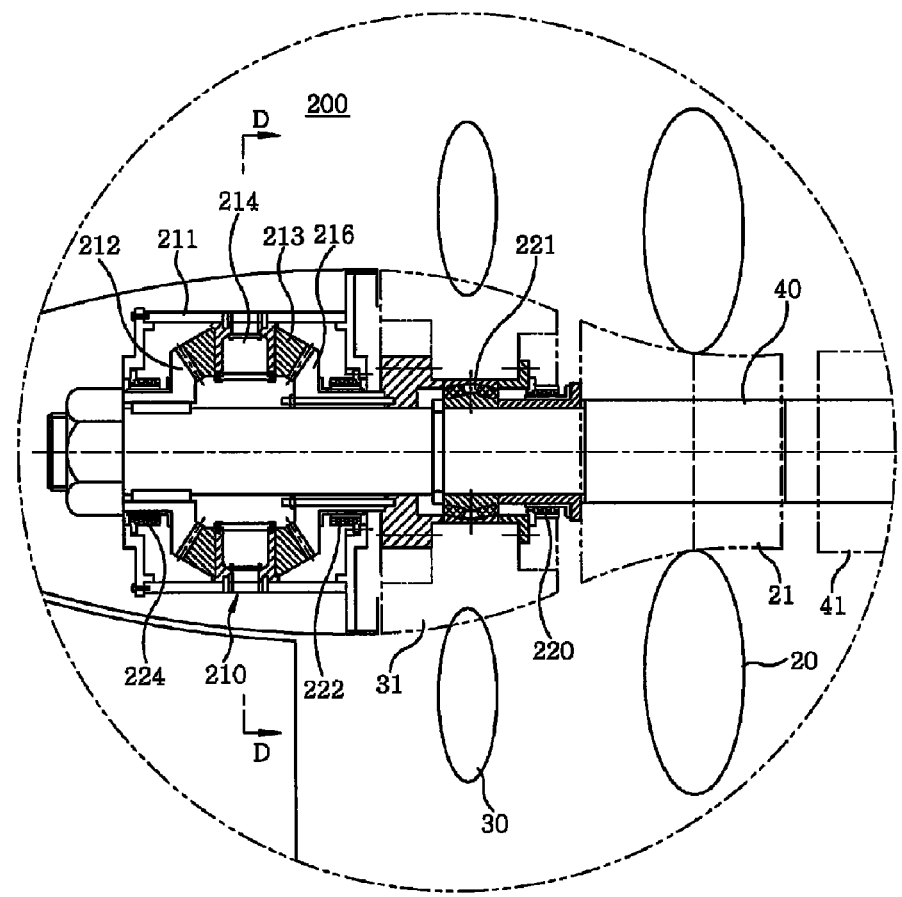
[Fig. 7]
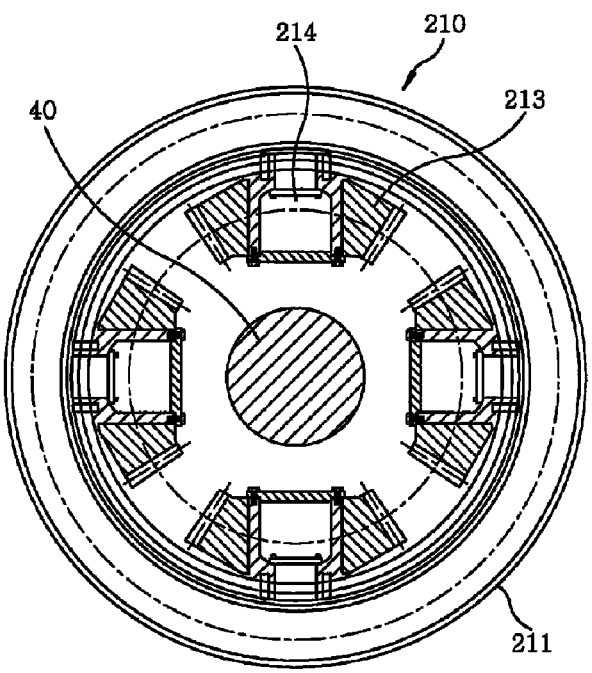

CONTRA-ROTATING PROPELLER SUPPORTED ON RUDDER HORN OF SHIP

TECHNICAL FIELD

The present invention relates to a contra-rotating propeller system supported on a rudder horn of a ship.

A propelling system is an apparatus that generates propulsion to allow an object, such as a surface ship or an underwater submarine, to advance at a certain speed.

BACKGROUND ART

A conventional propelling system has been used in diverse forms according to the characteristics and usage of ships, and a screw propeller system is the most basically and generally used in the art.

A representative screw propeller system is a fixed pitch propeller system.

Referring to FIG. 1, a fixed pitch propeller system 1 is shown to include blades, integrally fixed to a hub, connected to a rotating shaft thereof, so that the hub and the blades are rotated all together when the rotating shaft, which is connected to an engine, is rotated.

Here, the flow around the blades upon rotation generates variation in pressure on the surfaces of the blades to create thrust in the advancing direction of a ship, the speed of which can be continuously varied with the control of revolutions per minute.

However, the conventional fixed pitch propeller system 1 generates a spiral streamline, which causes to contract the wake flow 4a in shape behind the propeller system. This reduces an efficiency of the propeller and therefore the thrust of a ship.

In particular, since the conventional fixed pitch propeller system 1 generates a swirl flow 3a, such as a swirling vortex, perpendicular to the direction of thrust 2, energy loss is caused, so that the thrust efficiency is somewhat degraded.

Meanwhile, there is proposed a counter-rotating propeller system to remedy the above disadvantage and improve efficiency.

Referring to FIG. 2, a conventional counter-rotating propeller system 5 uses a power transmission system 6 having a complicated dual-propeller shaft structure, in which two propellers, rotating in opposite directions, are mounted on one shaft.

For example, the propeller shaft includes a hollow shaft member and a solid shaft member inserted into the hollow shaft member. A large front propeller is mounted on a hub of the hollow shaft member and is rotated in a normal direction at the outside, whereas a small rear propeller, positioned inside, is mounted on a hub of the solid shaft member and is rotated in a reverse direction.

The hydrodynamic actions of the front propeller and the counter-rotating rear propeller minimize the swirling flow and recover the energy, thereby increasing the thrust 2 in an amount of recovery 3b.

The conventional counter-rotating propeller system is widely used as a propeller system for a torpedo, which needs a straight running, since the propellers are rotated in counter directions relative to each other to achieve torque balance between the propellers. It has also been proved that, when also used in a general commercial ship, the conventional counter-rotating propeller system provides an improvement in thrust efficiency.

However, as set forth before, the conventional counter-rotating propeller system requires the dual-propeller shaft structure, the related power transmission system, and a special reverse-rotating device, which is not cost effective to be used in a general commercial ship. Thus, there are many restrictions in use because of the complexity and the excessive manufacturing cost of the counter-rotating system.

Further, the conventional counter-rotating propellers still have the above problems in that the wake flow 4b has a contracted shape, whereby the propeller efficiency is decreased and thus a thrust of a ship is lowered.

DISCLOSURE OF INVENTION

Technical Problem

The present invention has been made to solve the foregoing problems with the prior art, and therefore an object of the present invention is to provide a contra-rotating propeller system supported on the rudder horn of a ship which provides a simple power transmission structure, capable of simultaneously rotating front and rear propellers thereof in opposite directions, using the rudder horn of a ship as a supporting base for an epicyclic gear set.

Another object of the present invention is to provide a contra-rotating propeller system supported on a rudder horn of a ship which prevents the contraction of a wake flow of a propeller by employing an ellipsoidal shape of the rudder horn to utilize the hydrodynamic effect thereat, thereby improving the thrust efficiency in a ship.

Technical Solution

In accordance with one aspect of the invention, there is provided a contra-rotating propeller system installed between a rudder horn of a ship and shaft support at an engine-output side, the system including: a propeller shaft rotatably supported by the rudder horn and the shaft support, respectively; a front propeller fixed to the propeller shaft; a counter rotating gear set installed on the rudder horn and connected with the propeller shaft; and a rear propeller connected to the counter rotating gear set and disposed between the rudder horn and the front propeller.

Advantageous Effects

As set forth above, the contra-rotating propeller system supported on the rudder horn of a ship according to the present invention provides advantageous effect by minimizing the swirling flow with the contra-rotation of the propellers and thus recovering the energy. Further, it provides the improved thrust efficiency of a ship by simplifying the power transmission structure between the respective propellers with the installation of the epicyclic gear set on the rudder horn and by preventing the contraction of the wake flow in the propeller by employing the ellipsoidal shape of the rudder horn to utilize the hydrodynamic action thereat.

BRIEF DESCRIPTION OF THE DRAWINGS

The above and other objects and features of the present invention will become apparent from the following description of embodiments given in conjunction with the accompanying drawings, in which:

FIG. 1 is a schematic view of a conventional fixed pitch propeller system;

FIG. 2 is a schematic view of a conventional counter-rotating propeller system;

FIG. 3 is a side view illustrating a contra-rotating propeller system supported on a rudder horn of a ship according to first embodiment of the invention;

FIG. 4 is an enlarged sectional view of the circle A shown in FIG. 3;

FIG. 5 is a schematic view illustrating an epicyclic gear set taken along line C-C of FIG. 4;

FIG. 6 is a side view illustrating a contra-rotating propeller system supported on a rudder horn of a ship according to second embodiment of the invention; and FIG. 7 is a schematic view illustrating a bevel gear set taken along line D-D of FIG. 6.

MODE FOR THE INVENTION

Hereinafter, a description will be made in detail of exemplary embodiments of a contra-rotating propeller system supported on a rudder horn of a ship of the present invention with reference to FIGS. 3 to 7.

(First Embodiment)

FIG. 3 is a side view illustrating a contra-rotating propeller system supported on a rudder horn of a ship according to an embodiment of the invention, FIG. 4 is an enlarged sectional view of circle A, shown in FIG. 3, and FIG. 5 is a schematic view illustrating the epicyclic gear set taken along line C-C of FIG. 4.

As illustrated in FIG. 3, the contra-rotating propeller system 100 in accordance with a first embodiment, supported on the rudder horn of a ship, is designed in order to obviate a high cost special reversible gear and avoid problems associated with the installation of a long hollow shaft member for simultaneous rotation of a plurality of propulsion devices, that is, propellers, on the same shaft.

A rudder 11 in accordance with the first embodiment has a construction that protrudes vertically downward from the stern-side bottom of a ship 10. The rudder includes a key 11a that is rotatably connected with a rudder stock in a profile body fixed to the ship 10, and an ellipsoidal rudder horn 11b in the middle of the leading edge of the profile body.

In the contra-rotating propeller system 100 in accordance with the first embodiment, the epicyclic gear set 110, which yields the output for reverse rotation in response to the input of normal rotation, is installed on the rudder horn 11b, so that the front and rear propellers 20 and 30 are rotated in opposite directions.

Here, the contra-rotating propeller system 100 in accordance with the first embodiment is configured to minimize the swirling flow and thus to recover energy with the contra-rotation of the propellers 20 and 30, and to simplify the power transmission structure between the respective propellers 20 and 30. Furthermore, the contra-rotating propeller system 100 is also configured to prevent the contraction of the wake flow in the propeller by employing the ellipsoidal shape of the rudder horn 11b to obtain hydrodynamic effect. As a result, above configuration helps achieve more improved thrust efficiency in a ship.

Since the epicyclic gear set 110 requires only a small number of gear elements and a small installation space, it may be installed in a small rudder horn 11b to provide stable contra-rotation.

Meanwhile, in front of the rudder 11 at the stern-side bottom of the ship 10, a propeller shaft 40, which extends from an engine of the ship, is supported by a shaft support 41, which is supported by a reinforcing frame 42 extending from the bottom of the ship 10.

The propeller shaft 40 is connected to the epicyclic gear set 110 of the rudder horn 11b.

In this case, the rear propeller 30 is rotatably supported to the rudder horn 11b without being connected with the propeller shaft 40 through the epicyclic gear set 110. With such a simplified power transmission structure, the rear propeller 30 may be received a driving power for the reverse rotation.

Furthermore, in order to enhance the hydrodynamic effect according to a half ellipsoidal shape of the rudder horn 11b, it is preferable that hubs 21 and 31 of the front and rear propellers 20 and 30 have another half ellipsoidal shape corresponding to the half ellipsoidal shape of the rudder horn 11b.

With reference to an ellipsoidal body, it is preferable that the rudder horn 11b form a first half of the ellipsoidal body, and that the hubs 21 and 31 of the front and rear propellers 20 and 30 form two halves, respectively, of the second half of the ellipsoidal body.

In this case, since the wake flow of the propeller at a region L extends around the rudder horn 11b, the wake flow of the propeller is prevented from being contracted to thereby improve the thrust efficiency of a ship.

Now the construction of the power transmission structure of the contra-rotating propeller system 100 in accordance with the first embodiment will be described in detail.

As illustrated in FIGS. 4 and 5, the propeller shaft 40 is an element, which is connected to and rotated by an conventional engine for a ship. The propeller shaft 40 is connected to the epicyclic gear set 110 via the shaft support 41 in the engine output-side, and further extends up to a shaft bearing 50.

The hub 21 of the front propeller 20 is fixed to the propeller shaft 40, which is disposed outside an outlet of the shaft support 41, so that it can be rotated simultaneously with the propeller shaft 40.

The propeller shaft 40 penetrates through the hub 31 of the rear propeller 30 along the central axis thereof while extending from the hub 21 of the front propeller 20, and is shaft-coupled to a sun gear 112 of the epicyclic gear set 110.

Further, the propeller shaft 40 passing through the sun gear 112 extends through a gear housing 111 of the rudder horn 11b, and is then rotatably supported by a plurality of shaft bearings 50, arranged outside the gear housing 111.

The epicyclic gear set 110 includes the gear housing 111 mounted on the rudder horn 11b, the input side sun gear 112 rotatably arranged in the center inside the gear housing 111, a plurality of first planet gears 113 meshed with the sun gear 112, which are disposed around the sun gear 112 and pinion shafts 115 respectively, an planet gear carrier 114 maintaining an engagement between the sun gear 112 and the first planet gears 113 by rotatably being engaged with the pinion shafts 115 respectively, a plurality of second planet gears 116 fixed to ends of pinion shafts 115, which respectively extend through the planet gear carrier 114 from the first planet gears 113, and an output side ring gear 117 meshed with the second planet gears 116.

In accordance with the first embodiment of the present invention, the ring gear 117 is preferably installed in one side of the hub 31 of the rear propeller 30.

Further, it is preferable that the planet gear carrier 114 restricts the pinion shafts 115 between the first and second planet gears 113 and 116 using a plurality of pinion bearings such that the pinion shafts are able to rotate, and that the planet gear carrier 114 is fixed to the inside of the gear housing 111 using a fixing pin, a bolt or the like.

A first sealing unit 120 is preferably provided on the inner circumference of the other side of the hub 31 of the rear propeller 30 so as to form a seal. The sealing unit 120 may be a known element.

Plural rows of hub bearings 121 and a second sealing unit 122 around the ring gear 117 are preferably installed between the outer circumference of one side of the hub 31 of the rear propeller 30 and the inner circumference of the opening section of the gear housing.

It is preferred that the propeller shaft 40 and the sun gear 112 of the epicyclic gear set 110 are in spline 43 engagement with each other.

When the sun gear 112 is rotated in the normal direction by the propeller shaft 40, the first and second planet gears 113 and 116 all are reversely rotated as in the reverse rotation mechanism of the epicyclic gear set.

That is, the first and second planet gears 113 and 116 reversely rotate on their own axes without revolution because they are rotatably restricted to the fixed planet gear carrier 114.

Then, reversely rotating first and second planet gears 113 and 116 transmit the reverse rotational force to the ring gear 117 of the hub 31 of the rear propeller 30.

The rear propeller 30 performs reverse rotation at the same time that the front propeller 20 performs normal rotation, recovering the rotation loss of the front propeller 20, which occurs in the ship, thereby improving the thrust efficiency.

(Second Embodiment)

Hereinafter, a second embodiment of the present invention will be described. A contra-rotating propeller system 200 in accordance with the second embodiment of the present invention has similar configuration as compared to that of the first embodiment of the present invention except that a bevel gear set 210 is used as a substitute for the epicyclic gear set 110 of the first embodiment of the present invention. Therefore, the description similar to that of the first embodiment will be omitted, and same reference numerals will be used for the same elements with the first embodiment.

FIG. 6 is a side view illustrating a contra-rotating propeller system supported on a rudder horn of a ship according to second embodiment of the invention; and FIG. 7 is a schematic view illustrating a bevel gear set taken along line D-D of FIG. 6.

In accordance with the second embodiment of the present invention, the diameter of bevel gear set 210 may be smaller than the that of the epicyclic gear set 110 in accordance with the first embodiment of the present invention because the diameter of first and second bevel gear 212 and 216 may be configured smaller than that of the ring gear 117 in accordance with the first embodiment of the present invention.

The bevel gear set 210, as shown in FIG. 6, includes a gear housing 211, the first gear 212 arranged at the leading end portion of the propeller shaft 40 such that the teeth thereof face the shaft support 41 of the ship, idle gears arranged around the first bevel gear 212 to be meshed therewith and rotatively supported to the gear housing 211 through bearings, and the second bevel gear 216 meshed with the idle gears 213 and arranged at one end portion of the hub 31 of the rear propeller 30.

The construction of the power transmission structure of the contra-rotating propeller system 200 in accordance with the second embodiment of the present invention will be described in detail.

As shown in FIG. 6, the first and second bevel gears 212 and 216 are engaged each other through the idle gears 213, facing each other. Since the second bevel gear 216 facing the first bevel gear 212 is arranged to turn 180 degree with respect to the first bevel gear 212, when the first bevel gear 212 rotates in a normal direction, the second bevel gear 216 rotates in a counter direction thereof through the idle gears 213.

A third sealing unit 220 is preferably provided on the inner circumference of an engine output end of the ship of the hub 31 so as to form a seal.

Further, forth and fifth sealing units 224 and 222 are preferably provided between each outer circumference of the first and second bevel gears 212 and 216 and the inner circumference of the opened portion of the gear housing 211. Furthermore, plural rows of hub bearings 221 are preferably installed at a central portion of the inner circumference of the hub 31 of the rear propeller 30.

It is noted that the contra-rotating propeller system in accordance with the embodiments of the present invention may adopt any construction having a simple reversible gear structure by which a normal input rotation can be transferred to reverse output rotation.

In the contra-rotating propeller system in accordance with the first and the second embodiments of the present invention, the thrust efficiency is increased according to the hydrodynamic characteristic in which the wake flow of the propeller is extended due to the ellipsoidal shape of the rudder horn 11b. The contra-rotating propeller system further improves the thrust efficiency. The increase in efficiency also makes it possible to use a small-diameter propeller and relatively widen the gap G between the propeller and the ship 10, which can thus reduce the influence upon the ship 10 by pressure variation, which would otherwise occur due to cavitation in the propeller, thereby reducing vibrations of the ship 10.

While the invention has been shown and described with respect to the embodiments, it will be understood by those skilled in the art that various changes and modifications may be made without departing from the scope of the invention as defined in the following claims.

The invention claimed is:

1. A contra-rotating propeller system installed between a rudder horn of a ship and shaft support at an engine-output side, the system comprising:
    a propeller shaft rotatably supported by the rudder horn and the shaft support, respectively;
    a front propeller fixed to the propeller shaft;
    a counter rotating gear set installed on the rudder horn and connected with the propeller shaft; and
    a rear propeller connected to the counter rotating gear set via the propeller shaft penetrating an axis of the rear propeller and disposed between the rudder horn and the front propeller,
    wherein each of the rudder horn, a hub of the rear propeller, and a hub of the front propeller is designed to have substantially ellipsoidal body in shape together,
    wherein the counter rotating gear set rotates the rear propeller in a reverse direction to a rotating direction of the front propeller,
    wherein the counter rotating gear set includes epicyclic gear set, in which the epicyclic gear set has:
        a gear housing mounted on the rudder horn;
        a sun gear fixed to the propeller shaft and rotatably disposed in a central portion inside the gear housing;
        a plurality of first planet gears arranged around the sun gear to be meshed with the sun gear, each planet gear having a pinion shaft at a center thereof;
        a planet gear carrier rotatably connected with each pinion shaft to maintain an engagement between the sun gear and the first planet gears;
        a plurality of second planet gears respectively fixed to end portions of the pinion shafts extending through the planet gear carrier; and
        a ring gear meshed with the second planet gears and mounted on one end portion of a hub of the rear propeller,
    wherein the planet gear carrier is fixed to the gear housing, and wherein a first sealing unit is provided on an inner circumference in the other side of the hub of the rear propeller.

2. A contra-rotating propeller system installed between a rudder horn of a ship and shaft support at an engine-output side, the system comprising:
- a propeller shaft rotatably supported by the rudder horn and the shaft support, respectively;
- a front propeller fixed to the propeller shaft;
- a counter rotating gear set installed on the rudder horn and connected with the propeller shaft; and
- a rear propeller connected to the counter rotating gear set via the propeller shaft penetrating an axis of the rear propeller and disposed between the rudder horn and the front propeller,
- wherein each of the rudder horn, a hub of the rear propeller, and a hub of the front propeller is designed to have substantially ellipsoidal body in shape together,
- wherein the counter rotating gear set rotates the rear propeller in a reverse direction to a rotating direction of the front propeller,
- wherein the counter rotating gear set includes epicyclic gear set, in which the epicyclic gear set has:
  - a gear housing mounted on the rudder horn;
  - a sun gear fixed to the propeller shaft and rotatably disposed in a central portion inside the gear housing;
  - a plurality of first planet gears arranged around the sun gear to be meshed with the sun gear, each planet gear having a pinion shaft at a center thereof;
  - a planet gear carrier rotatably connected with each pinion shaft to maintain an engagement between the sun gear and the first planet gears;
  - a plurality of second planet gears respectively fixed to end portions of the pinion shafts extending through the planet gear carrier; and
  - a ring gear meshed with the second planet gears and mounted on one end portion of a hub of the rear propeller,
- wherein the planet gear carrier is fixed to the gear housing, and
- wherein plural rows of hub bearings and a second sealing unit are installed between an outer circumferential portion in one side of the hub of the rear propeller and an inner circumferential portion in the opening section of the gear housing around the ring gear.

3. The contra-rotating propeller system according to claim 1, wherein the rudder horn forms a first half of the ellipsoidal body, and the hubs of the front and rear propellers form two halves, respectively, of a second half of the ellipsoidal body.

4. A contra-rotating propeller system installed between a rudder horn of a ship, and shaft support at an engine-output side, the system comprising:
- a propeller shaft rotatably supported by the rudder horn and the shaft support, respectively;
- a front propeller fixed to the propeller shaft;
- a counter rotating gear set installed on the rudder horn and connected with the propeller shaft; and
- a rear propeller connected to the counter rotating gear set via the propeller shaft penetrating an axis of the rear propeller and disposed between the rudder horn and the front propeller,
- wherein each of the rudder horn, a hub of the rear propeller, and a hub of the front propeller is designed to have substantially ellipsoidal body in shape together,
- wherein the counter rotating gear set rotates the rear propeller in a reverse direction to a rotating direction of the front propeller, and
- wherein the counter rotating gear set includes a bevel gear set, in which the bevel gear set has:
  - a gear housing mounted on the rudder horn;
  - a first bevel gear engaged with the propeller shaft and arranged such that teeth thereof face an engine output end of the ship and rotatably supported at a central portion of inside of the gear housing;
  - idle gears arranged around the first bevel gear to be meshed therewith and rotatably supported to the gear housing; and
  - a second bevel gear meshed with the idle gears and arranged at one end portion of the hub of the rear propeller.

5. The contra-rotating propeller system according to claim 4, further comprising a third sealing unit provided on an inner circumference of the engine output end of the hub of the rear propeller.

6. The contra-rotating propeller system according to claim 4, further comprising fourth sealing unit and fifth sealing unit provided between an outer circumference of each the first bevel gear and the second bevel gear and an opened portion of the gear housing, respectively.

7. The contra-rotating propeller system according to claim 4, further comprising a bearing provided on a central portion of an inner circumference of the hub of the rear propeller.

* * * * *